(12) United States Patent
Um et al.

(10) Patent No.: US 11,703,734 B2
(45) Date of Patent: Jul. 18, 2023

(54) DISPLAY PANEL

(71) Applicant: TCL CHINA STAR OPTOELECTRONICS TECHNOLOGY CO., LTD., Guangdong (CN)

(72) Inventors: Yoonsung Um, Guangdong (CN); Chuwei Liang, Guangdong (CN)

(73) Assignee: TCL CHINA STAR OPTOELECTRONICS TECHNOLOGY CO., LTD, Guangdon (CN)

( * ) Notice: Subject to any disclaimer, the term of this patent is extended or adjusted under 35 U.S.C. 154(b) by 611 days.

(21) Appl. No.: 16/768,700

(22) PCT Filed: Apr. 15, 2020

(86) PCT No.: PCT/CN2020/084831
§ 371 (c)(1),
(2) Date: Jun. 1, 2020

(87) PCT Pub. No.: WO2021/196285
PCT Pub. Date: Oct. 7, 2021

(65) Prior Publication Data
US 2023/0092037 A1    Mar. 23, 2023

(30) Foreign Application Priority Data
Apr. 1, 2020   (CN) .......................... 202010251437.8

(51) Int. Cl.
*G02F 1/1368* (2006.01)
*G02F 1/1362* (2006.01)

(52) U.S. Cl.
CPC ........ *G02F 1/1368* (2013.01); *G02F 1/13624* (2013.01); *G02F 1/136222* (2021.01); *G02F 1/136286* (2013.01)

(58) Field of Classification Search
CPC ..................................................... G02F 1/1368
See application file for complete search history.

(56) References Cited

U.S. PATENT DOCUMENTS

2006/0061713 A1*  3/2006  Nakamura ........ G02F 1/133555
                                                   349/113
2006/0158576 A1    7/2006  Kim et al.
(Continued)

FOREIGN PATENT DOCUMENTS

CN    104865763 A         8/2015
CN    105137676    *   12/2015   ......... G02F 1/13434
(Continued)

*Primary Examiner* — Sang V Nguyen
(74) *Attorney, Agent, or Firm* — Soroker Agmon Nordman; Sharone Godesh; Daniel Schatz

(57) ABSTRACT

A display panel includes an array substrate, a color filter substrate, and a liquid crystal layer. The array substrate includes a scan line and a data line; a pixel electrode disposed corresponding to a pixel area; a first thin film transistor configured to electrically connect the pixel electrode to the scan line and the data line; an auxiliary electrode disposed on a same layer as the pixel electrode and arranged around the pixel electrode; and a second thin film transistor configured to electrically connect the auxiliary electrode to the first thin film transistor. Potential received by the pixel electrode and potential received by the auxiliary electrode have a difference.

20 Claims, 3 Drawing Sheets

(56) References Cited

U.S. PATENT DOCUMENTS

| | | | |
|---|---|---|---|
| 2007/0052902 A1 | 3/2007 | Yoo et al. | |
| 2008/0192196 A1 | 8/2008 | Liu et al. | |
| 2009/0009672 A1* | 1/2009 | Chung | G02F 1/136213 |
| | | | 349/38 |
| 2015/0124206 A1* | 5/2015 | Chang | G02F 1/134363 |
| | | | 349/139 |
| 2019/0146284 A1* | 5/2019 | Bae | G02F 1/136286 |
| | | | 349/139 |
| 2019/0196276 A1* | 6/2019 | Kim | G02F 1/1368 |

FOREIGN PATENT DOCUMENTS

| | | | | |
|---|---|---|---|---|
| CN | 105137676 A | | 12/2015 | |
| CN | 109799659 | * | 5/2019 | G02F 1/1343 |
| CN | 109799659 A | | 5/2019 | |

* cited by examiner

DISPLAY PANEL

FIELD OF INVENTION

The present disclosure relates to the field of display technologies, and more particularly to a display panel.

BACKGROUND OF INVENTION

Thin film transistor liquid crystal display (TFT-LCD) is a type of liquid crystal display. It uses thin film transistor technology to improve image quality and is widely used in televisions, flat panel displays, and projectors.

In order to improve a display performance of a liquid crystal display, a traditional pixel design is to design a pixel structure as four display domains. Rotation angles of liquid crystal molecules of the four display domains are different, thereby improving the display performance. However, in this type of pixel design, color of large viewing angles may become lighter in terms of viewing angle. Eight-domain display is a structural optimization based on four-domain display, which can improve the viewing angles to some extent. However, due to a complicated pixel structure of the eight-domain display, more functional blocks are required. This results in a wide dark area and a large percentage of an aperture ratio is lost, and a penetration rate is low, which affects performance of the liquid crystal display.

Therefore, the prior art has defects and needs to be solved urgently.

SUMMARY OF INVENTION

The present application provides a display panel, which can solve issues that a dark area in a conventional pixel structure is wider, thereby losing a pixel aperture ratio and a lower penetration rate and affecting display performance of a product.

To solve the above issues, technical solutions provided by the present application are as follows:

An embodiment of the present application provides a display panel, comprising an array substrate; a color filter substrate disposed opposite to the array substrate; and a liquid crystal layer disposed between the array substrate and the color filter substrate. The array substrate comprising a scan line extending in a horizontal direction; a data line extending in a longitudinal direction; a pixel electrode disposed corresponding to a pixel area surrounded by the scan line and the data line; a first thin film transistor disposed corresponding to the pixel area, and configured to electrically connect the pixel electrode to the scan line and the data line; an auxiliary electrode disposed on a same layer as the pixel electrode and arranged around the pixel electrode; and a second thin film transistor disposed corresponding to the pixel area, and configured to electrically connect the auxiliary electrode to the first thin film transistor. Potential received by the pixel electrode and potential received by the auxiliary electrode have a difference.

In an embodiment of the present application, a size of the second thin film transistor is less than a size of the first thin film transistor.

In an embodiment of the present application, a width-to-length ratio of a channel of the second thin film transistor is less than a width-to-length ratio of a channel of the first thin film transistor.

In an embodiment of the present application, the potential received by the auxiliary electrode is less than the potential received by the pixel electrode.

In an embodiment of the present application, a source of the first thin film transistor is electrically connected to the data line, a gate of the first thin film transistor is electrically connected to the scan line, a drain of the first thin film transistor is electrically connected to the pixel electrode and a source of the second thin film transistor; a gate of the second thin film transistor is electrically connected to the scan line, and a drain of the second thin film transistor is electrically connected to the auxiliary electrode.

In an embodiment of the present application, the auxiliary electrode is disposed around at least three sides of the pixel electrode, and a gap is formed between the auxiliary electrode and the pixel electrode.

In an embodiment of the present application, a portion of the auxiliary electrode parallel to the data line overlaps or partially overlaps with an edge of the data line in a direction perpendicular to the array substrate, and the portion of the auxiliary electrode parallel to the scan line overlaps or partially overlaps with an edge of the scan line in a direction perpendicular to the array substrate.

In an embodiment of the present application, a boundary of a side of the portion of the auxiliary electrode parallel to the data line near the pixel electrode is correspondingly located between the data line and the pixel electrode, and a boundary of a side of the portion of the auxiliary electrode parallel to the scan line near the pixel electrode is correspondingly located between the scan line and the pixel electrode.

In an embodiment of the present application, two sides of the data line respectively overlap or partially overlap with the auxiliary electrodes corresponding to two adjacent pixel areas in a direction perpendicular to the array substrate, respectively, and the auxiliary electrodes corresponding to two adjacent pixel areas are insulated from each other.

In an embodiment of the present application, the pixel electrode comprises a trunk electrode arranged in a cross shape and a branch electrode connected to the trunk electrode.

To solve the above issues, an embodiment of the present application further provides a display panel, comprising an array substrate; a color filter substrate disposed opposite to the array substrate; and a liquid crystal layer disposed between the array substrate and the color filter substrate. The color filter substrate comprises a color filter layer and a common electrode layer disposed on the color filter layer. The array substrate comprises a scan line extending in a horizontal direction; a data line extending in a longitudinal direction; a pixel electrode disposed corresponding to a pixel area surrounded by the scan line and the data line; a first thin film transistor disposed corresponding to the pixel area, and configured to electrically connect the pixel electrode to the scan line and the data line; an auxiliary electrode disposed on a same layer as the pixel electrode and arranged around the pixel electrode; and a second thin film transistor disposed corresponding to the pixel area, and configured to electrically connect the auxiliary electrode to the first thin film transistor. Potential received by the pixel electrode and potential received by the auxiliary electrode have a difference.

In an embodiment of the present application, a size of the second thin film transistor is less than a size of the first thin film transistor.

In an embodiment of the present application, a width-to-length ratio of a channel of the second thin film transistor is less than a width-to-length ratio of a channel of the first thin film transistor.

In an embodiment of the present application, the potential received by the auxiliary electrode is less than the potential received by the pixel electrode.

In an embodiment of the present application, a source of the first thin film transistor is electrically connected to the data line, a gate of the first thin film transistor is electrically connected to the scan line, a drain of the first thin film transistor is electrically connected to the pixel electrode and a source of the second thin film transistor; a gate of the second thin film transistor is electrically connected to the scan line, and a drain of the second thin film transistor is electrically connected to the auxiliary electrode.

In an embodiment of the present application, the auxiliary electrode is disposed around at least three sides of the pixel electrode, and a gap is formed between the auxiliary electrode and the pixel electrode.

In an embodiment of the present application, a portion of the auxiliary electrode parallel to the data line overlaps or partially overlaps with an edge of the data line in a direction perpendicular to the array substrate, and the portion of the auxiliary electrode parallel to the scan line overlaps or partially overlaps with an edge of the scan line in a direction perpendicular to the array substrate.

In an embodiment of the present application, a boundary of a side of the portion of the auxiliary electrode parallel to the data line near the pixel electrode is correspondingly located between the data line and the pixel electrode, and a boundary of a side of the portion of the auxiliary electrode parallel to the scan line near the pixel electrode is correspondingly located between the scan line and the pixel electrode.

In an embodiment of the present application, two sides of the data line respectively overlap or partially overlap with the auxiliary electrodes corresponding to two adjacent pixel areas in a direction perpendicular to the array substrate, respectively, and the auxiliary electrodes corresponding to two adjacent pixel areas are insulated from each other.

In an embodiment of the present application, the pixel electrode comprises a trunk electrode arranged in a cross shape and a branch electrode connected to the trunk electrode.

Beneficial effect:

Beneficial effects of embodiments of the present invention: In the display panel provided by embodiments of the present application, based on the four-domain display of the pixel structure, the auxiliary electrode is disposed around the pixel electrode, and a thin film transistor is connected to the auxiliary electrode. This makes the potential received by the pixel electrode and the potential received by the auxiliary electrode have a difference, thereby driving liquid crystal around a pixel to deflect, thereby improving color shift at large viewing angles. In addition, a dark area around the pixel can be reduced, thereby improving a pixel aperture ratio.

DESCRIPTION OF DRAWINGS

Technical solutions and other beneficial effects of the present application will be apparent through the detailed description of the specific implementation of the present application in conjunction with the accompanying drawings.

DETAILED DESCRIPTION OF PREFERRED EMBODIMENTS

Figure 1:
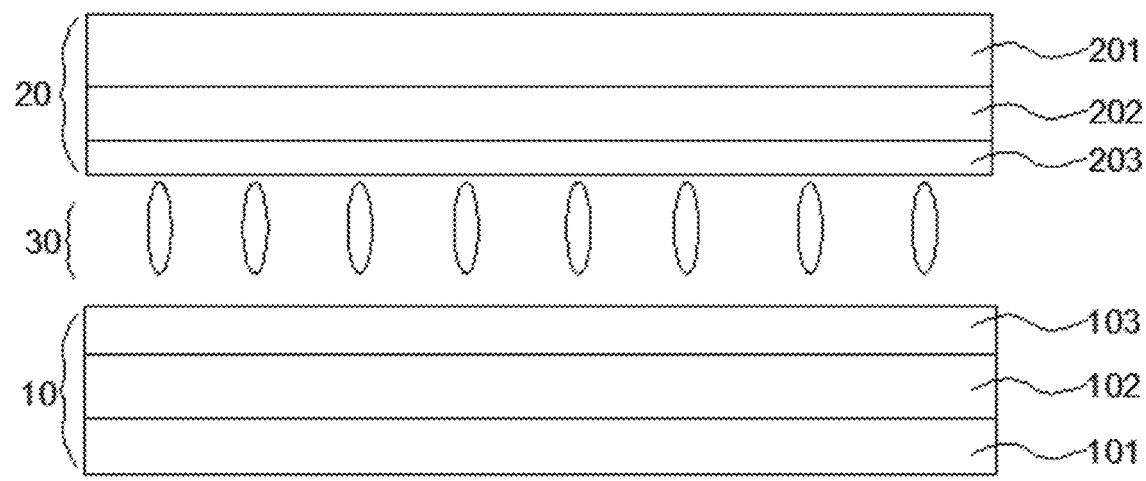
FIG. 1 is a schematic structural diagram of a display panel according to an embodiment of the present application.

The technical solutions in the embodiments of the present application will be described clearly and completely with reference to the drawings in the embodiments of the present application. Obviously, the described embodiments are only a part of the embodiments of the present application, but not all the embodiments. Based on the embodiments in the present application, all other embodiments obtained by those skilled in the art without making creative efforts fall within the protection scope of the present application.

In the description of the present application, it should be understood that the terms "vertical", "horizontal", "length", "width", "upper", "lower", "front", "rear", "left", "right", "perpendicular", "parallel", etc. indicating an orientation or positional relationship is based on an orientation or positional relationship shown in the drawings. This is only for the convenience of describing the present application and simplifying the description, rather than indicating or implying that the device or element referred to must have a specific orientation, be constructed and operate in a specific orientation, and therefore cannot be construed as limiting the present application. In addition, the terms "first" and "second" are used for description purposes only and cannot be understood as indicating or implying relative importance or implicitly indicating the number of technical features indicated. Thus, the features defined as "first" and "second" may explicitly or implicitly include one or more of the features. In the description of the present application, the meaning of "plurality" is two or more, unless otherwise specifically limited. In the present application, "/" means "or".

The present application may repeat reference numerals and/or reference letters in different examples. This repetition is for simplicity and clarity and does not in itself indicate a relationship between various embodiments and/or settings discussed.

A conventional eight-domain pixel structure is relatively complicated, requiring a voltage divider structure for a main area and an auxiliary area, and requires more functional blocks. Therefore, a dark area of a gate line between the main area and the auxiliary area is wider than a dark area of a gate line of a four-domain pixel structure. This will lose a large percentage of an aperture ratio. Under the same liquid crystal efficiency and the same size pixel, transmittance of the eight-domain pixel structure is lower than that of the four-domain pixel structure.

Based on this, a display panel of an embodiment of the present application adopts a four-domain pixel structure and improves on the basis of an existing four-domain pixel structure, thereby improving a pixel aperture ratio and a penetration rate and improving color shift at large viewing angles.

The display panel of an embodiment of the present application will be described in detail below in conjunction with specific embodiments.

Referring to FIG. 1, which is a schematic structural diagram of a display panel according to an embodiment of the present application. The display panel includes an array substrate 10 and a color filter substrate 20 disposed oppositely, and a liquid crystal layer 30 between the array substrate 10 and the color filter substrate 20.

The array substrate 10 includes a first substrate 101, and an array driving layer 102 and an electrode layer 103 that are sequentially stacked on the first substrate 101. The array driving layer 102 includes a pixel driving circuit and signal traces. The electrode layer 103 includes, but is not limited to, a pixel electrode electrically connected to the pixel driving circuit and an auxiliary electrode disposed around the pixel electrode.

The color filter substrate 20 includes but is not limited to a second substrate 201 and a color filter layer 202 on a side of the second substrate 201 facing the array substrate 10. A common electrode layer 203 is disposed on a side of the color filter substrate 20 facing the liquid crystal layer 30. The common electrode layer 203 includes a common electrode disposed symmetrically with the pixel electrode.

The display panel drives the liquid crystal in the liquid crystal layer 30 between the common electrode and the pixel electrode to be properly arranged/rotated by a vertical electric field formed between the common electrode and the pixel electrode. Therefore, backlight can pass through the display panel to realize display.

The array substrate 10 includes a plurality of scan lines extending in a horizontal direction and a plurality of data lines extending in a longitudinal direction. A plurality of the scan lines and a plurality of the data lines surround a pixel area of an array. One pixel area corresponds to one pixel unit, that is, one light emitting unit. In an embodiment, a structural design of one pixel unit is used as an example for description. It can be understood that other pixel units on the display panel are consistent with the structural design of the pixel unit.

Figure 2:
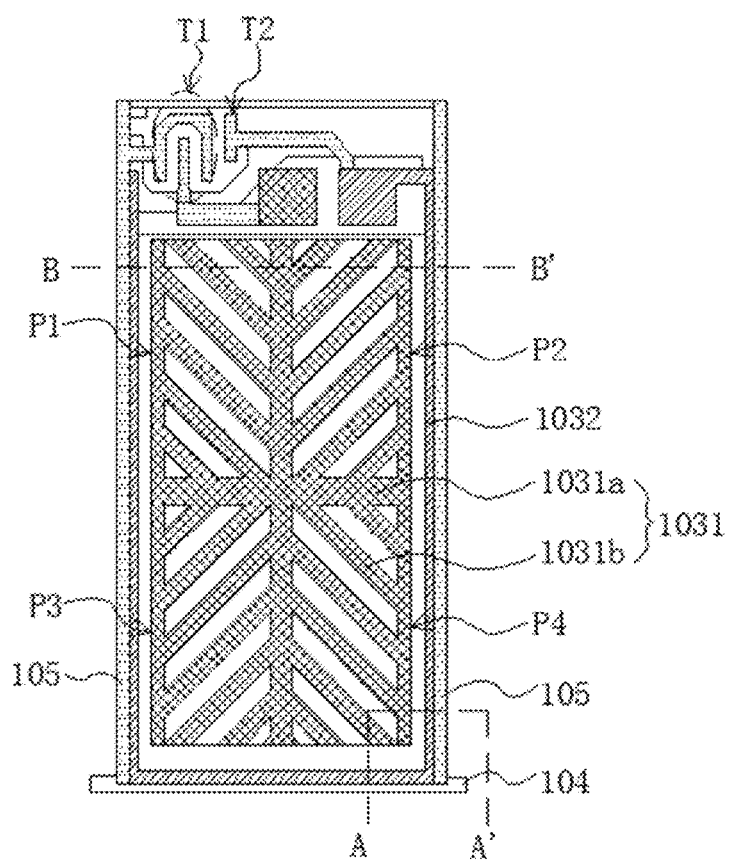
FIG. 2 is a schematic diagram of a pixel structure of a display panel according to an embodiment of the present application.

For details, referring to FIG. 2, which is a schematic diagram of a pixel structure of a display panel according to an embodiment of the present application. Two adjacent scan lines 104 and two adjacent data lines 105 form a pixel area. A pixel electrode 1031 is correspondingly provided for each pixel area. The pixel electrode 1031 includes a trunk electrode 1031a arranged in a cross shape and a branch electrode 1031b connected to the trunk electrode 1031a. The pixel structure of this embodiment has four display domains, that is, it includes a first domain P1, a second domain P2, a third domain P3, and a fourth domain P4. Extension directions of the branch electrodes 1031b corresponding to two adjacent domains are different. Regularly arranged slits are formed between two adjacent branch electrodes 1031b of each domain. Arrangement directions of liquid crystal molecules corresponding to the four domains are different.

The auxiliary electrode 1032 is disposed around at least three sides of the pixel electrode 1031, the auxiliary electrode 1032 is disposed on a same layer as the pixel electrode 1031 and arranged around the pixel electrode 1031, and a gap is formed between the auxiliary electrode 1032 and the pixel electrode 1031.

Further, the auxiliary electrode 1032 is the same material as the pixel electrode 1031 and may include but not limited to oxide semiconductor materials such as ITO, IGZO, IGZTO, and IZTO.

The pixel structure further includes a first thin film transistor T1 and a second thin film transistor T2. The first thin film transistor T1 and the second thin film transistor T2 are both disposed corresponding to the pixel area. The first thin film transistor T1 is electrically connected to the pixel electrode 1031 through a via hole of an insulating layer and is configured to electrically connect the pixel electrode 1031 to the scan line 104 and the data line 105. The second thin film transistor T2 is electrically connected to the auxiliary electrode 1032 through the via hole of the insulating layer and is configured to electrically connect the auxiliary electrode 1032 to the first thin film transistor T1.

Specifically, a source of the first thin film transistor T1 is electrically connected to the data line 105. A gate of the first thin film transistor T1 is electrically connected to the scan line 104. A drain of the first thin film transistor T1 is electrically connected to the pixel electrode 1031 and a source of the second thin film transistor T2. A gate of the second thin film transistor T2 is electrically connected to the scan line 104. A drain of the second thin film transistor T2 is electrically connected to the auxiliary electrode 1032.

It is understood that, the pixel structure also includes components such as capacitors, which are not limited herein.

A size of the second thin film transistor T2 is less than a size of the first thin film transistor T1.

Further, a width-to-length ratio of a channel of the second thin film transistor T2 is less than a width-to-length ratio of a channel of the first thin film transistor T1. Therefore, potential received by the pixel electrode 1031 and potential received by the auxiliary electrode 1032 have a difference. The potential received by the auxiliary electrode 1032 is less than the potential received by the pixel electrode 1031.

A purpose of the second thin film transistor T2 is to achieve a voltage division effect with a smaller width-to-length ratio (W/L) than the first thin film transistor T1. That is, cooperation between the first thin film transistor T1 and the second thin film transistor T2 is similar to thin film transistors corresponding to main and sub pixels in an eight-domain pixel structure.

Furthermore, a voltage of the auxiliary electrode 1032 is about 70% of a voltage of the pixel electrode 1031.

An electric field in a horizontal direction is formed between the pixel electrode 1031 and the auxiliary electrode 1032, and liquid crystal molecules between the pixel electrode 1031 and the auxiliary electrode 1032 can be driven to be properly arranged/rotated. That is, the liquid crystal molecules located around the pixel electrode 1031 can be driven to tilt from the periphery to the middle.

Because liquid crystal molecules around a pixel electrode in a conventional pixel structure are not deflected, a dark area around a pixel structure is wider, and an aperture ratio and transmittance are reduced. According to an embodiment of the present application, arrangement of the auxiliary electrode can increase a pixel aperture ratio and transmittance. Electric field strength of a horizontal electric field formed between the pixel electrode 1031 and the auxiliary electrode 1032 is different from a vertical electric field formed between the pixel electrode 1031 and the common electrode, Deflection angles are different, so that viewing angles can be improved. The pixel structure of the embodiment of the present application adopts four-domain display, so the deflection angles of the liquid crystal molecules around the pixel electrodes corresponding to different domains are different, which is equivalent to realizing eight-domain display. Therefore, the viewing angles can be further improved to solve issues that the pixel structure of the conventional four-domain display is prone to color shift under large viewing angles.

The first thin film transistor T1 in FIG. 2 adopts a U-type structure, and the second thin film transistor T2 adopts an I-type structure but is not limited thereto. It suffices that a voltage of the auxiliary electrode 1032 is lower than a voltage of the pixel electrode 1031. A film structure of the first thin film transistor T1 and a film structure of the second thin film transistor T2 are the same.

Figure 3:
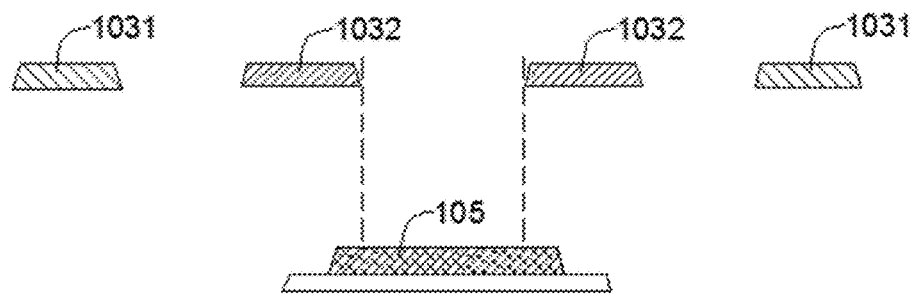
FIG. 3 is a schematic cross-sectional view taken along line A-A' in FIG. 2.

Combined with FIG. 2 and FIG. 3, FIG. 3 is a schematic cross-sectional view taken along line A-A' in FIG. 2. a portion of the auxiliary electrode 1032 parallel to the data line 105 overlaps or partially overlaps with an edge of the data line 105 in a direction perpendicular to the array substrate, and the portion of the auxiliary electrode 1032 parallel to the scan line 104 overlaps or partially overlaps with an edge of the scan line 104 in a direction perpendicular to the array substrate. Two sides of the data line 105 respectively overlap or partially overlap with the auxiliary electrodes 1031 corresponding to two adjacent pixel areas in a direction perpendicular to the array substrate, respectively, and the auxiliary electrodes 1031 corresponding to two adjacent pixel areas are insulated from each other.

In this embodiment, an example will be described in which the auxiliary electrode 1032 partially overlaps the data line 105 and the scan line 104. That is, a boundary of a side of the portion of the auxiliary electrode 1031 parallel to the data line 105 near the pixel electrode 1031 is correspondingly located between the data line 105 and the pixel electrode 1031, and a boundary of a side of the portion of the auxiliary electrode 1032 parallel to the scan line 104 near the pixel electrode 1031 is correspondingly located between the scan line 104 and the pixel electrode 1031.

There is a gap between the auxiliary electrode 1032 and the pixel electrode 1031. Under an electric field formed by the auxiliary electrode 1032 and the pixel electrode 1031, the corresponding liquid crystal at the gap is deflected. The auxiliary electrode 1032 has an edge covering the data line 105, and an electric field is not formed between two adjacent auxiliary electrodes 1032, so the auxiliary electrode 1032 still functions as a shield electrode (DBS). This can reduce influence of the data line 105 on the pixel electrode 1031.

Figure 4:
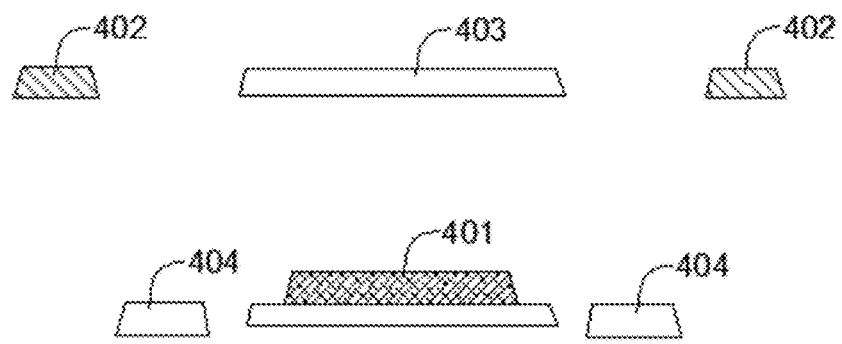
FIG. 4 is a schematic partial cross-sectional view of a pixel structure of a conventional display panel.

Combined with FIG. 3 and FIG. 4, FIG. 4 is a schematic partial cross-sectional view of a pixel structure of a conventional display panel. In a conventional pixel structure, in order to reduce influence of the data line 401 on the pixel electrode 402, a shield electrode 403 having the same potential as the common electrode is usually provided above the data line 401. The liquid crystal at the position corresponding to the shield electrode 403 is not deflected, thereby achieving the effect of shielding light (equivalent to BM). In order to reduce the influence of the pixel area corresponding to the data line 401, common electrodes (Acorn shilding metal) 404 are provided on both sides of the data line 401. Because the liquid crystal corresponding to the position of the pixel electrode 402 is deflected in the conventional pixel structure, a dark area of the pixel is wider. Calculation of the dark area is from a left boundary of a left common electrode 404 to a right boundary of a right common electrode 404, so an aperture ratio decreases. In addition, dark stripes may also be generated in a gap between the pixel electrode 402 and the scan line. Taking a 55UD product as an example, a width of the pixel is 105 microns, a width of the dark area is 25.8 microns, and an effective opening width is 79.2 microns.

As shown in FIG. 3, in a pixel structure of a display panel according to an embodiment of the present application, common electrodes (Acorn shilding metal) on both sides of a data line are eliminated. A dark area of a pixel is a width of the data line 105, so an aperture ratio is greatly improved. Taking a 55UD product as an example, a width of the pixel is 105 microns, a width of the dark area is 15.2 microns, and an effective opening width is 89.4 microns.

(89.4−79.2)/79.2=12.9%, it can be seen that a pixel aperture ratio of an embodiment of the present application is improved by 12.9% compared to a pixel aperture ratio of a conventional pixel structure.

Figure 5:
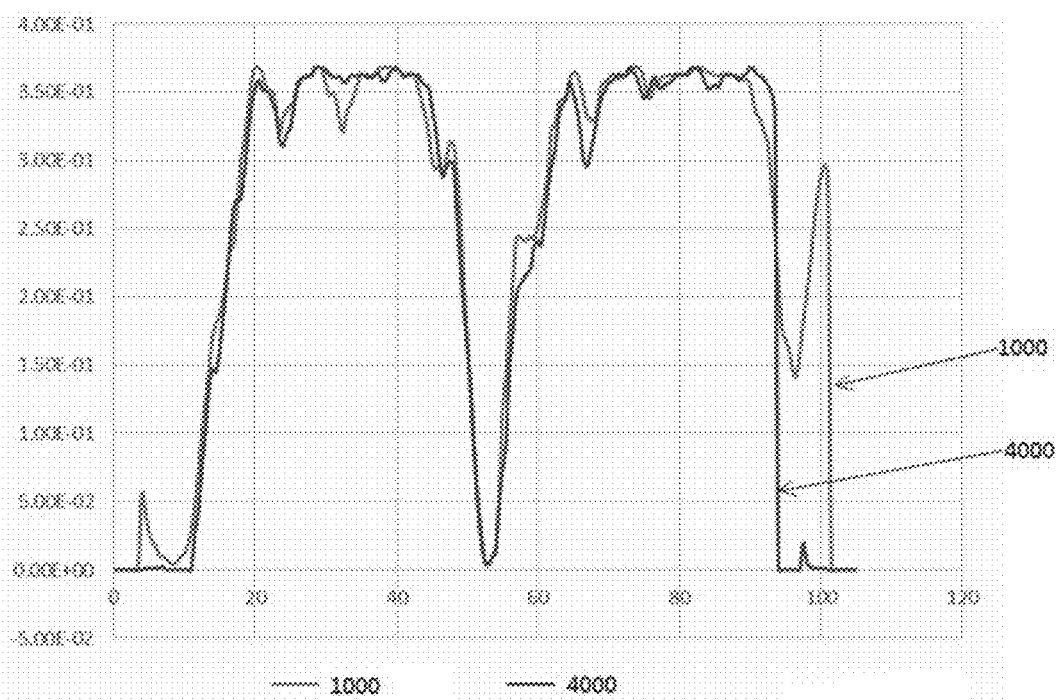
FIG. 5 is a comparison diagram of pixel cross-sectional brightness of a pixel structure of an embodiment of the present application and a conventional pixel structure along a direction perpendicular to a data line.

Combined with FIG. 2 and FIG. 5, FIG. 5 is a comparison diagram of pixel cross-sectional brightness of a pixel structure of an embodiment of the present application and a conventional pixel structure along a direction perpendicular to a data line. A pixel cross section along a direction perpendicular to the data line can refer to a pixel cross section of B-B' line in FIG. 2. In FIG. 5, abscissa is a width of a pixel, and ordinate is a brightness of the pixel. A brightness curve of a pixel structure of an embodiment of the present application is 1000, and a brightness curve of a conventional pixel structure is 4000. It is obvious that a difference in pixel brightness between the corresponding areas of two adjacent domains (that is, a pixel width is between 10-90) is not significant. However, in edge areas of the data lines on both sides, the pixel structure of the embodiment of the present application obviously has a wider bright state region. That is, the pixel width is between 0-10 and 90-100 (the edge area of the data line), the brightness of the pixel structure of the embodiment of the present application is significantly higher than that of the conventional pixel structure.

Figure 6:
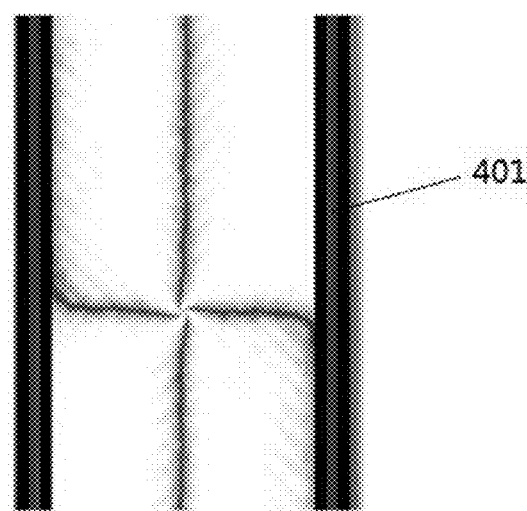
FIG. 6 is a partial schematic diagram of a conventional pixel structure.
Figure 7:
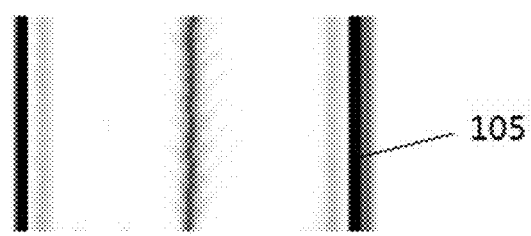
FIG. 7 is a partial schematic diagram of brightness of a pixel structure according to an embodiment the present application.

Combined with FIG. 6 and FIG. 7, FIG. 6 is a partial schematic diagram of a conventional pixel structure, and FIG. 7 is a partial schematic diagram of brightness of a pixel structure according to an embodiment the present application. A brightness simulation test is performed on two pixel structures. As a pixel voltage increased, areas on both sides of the data line 105 in the pixel structure of the embodiment of the present application gradually became brighter, while areas on both sides of the data line 401 in the conventional pixel structure remained dark. It can be seen that, the pixel structure of the embodiment of the present application significantly reduces the dark area of the pixel, so that an opening area of the pixel increases.

Beneficial effects of embodiments of the present invention: In the display panel provided by embodiments of the present application, based on the four-domain display of the pixel structure, the auxiliary electrode is disposed around the pixel electrode, and a thin film transistor is connected to the auxiliary electrode. This makes the potential received by the pixel electrode and the potential received by the auxiliary electrode have a difference, thereby driving liquid crystal around a pixel to deflect, thereby improving color shift at large viewing angles. In addition, a dark area around the pixel can be reduced, thereby improving a pixel aperture ratio.

In summary, although the present invention has been disclosed as above with preferred embodiments, the above preferred embodiments are not intended to limit the present invention. Those skilled in the art can make various modifications and retouching without departing from the spirit and scope of the present invention. Therefore, the protection scope of the present invention is subject to the scope defined by the claims.

What is claimed is:

1. A display panel, comprising:
an array substrate;
a color filter substrate disposed opposite to the array substrate and comprising a common electrode layer; and
a liquid crystal layer disposed between the array substrate and the color filter substrate;
the array substrate comprising:
a scan line extending in a horizontal direction;
a data line extending in a longitudinal direction;
a pixel electrode disposed corresponding to a pixel area surrounded by the scan line and the data line;
a first thin film transistor disposed corresponding to the pixel area, and configured to electrically connect the pixel electrode to the scan line and the data line;
an auxiliary electrode disposed on a same layer as the pixel electrode and arranged around the pixel electrode; and
a second thin film transistor disposed corresponding to the pixel area, wherein the auxiliary electrode is connected to the first thin film transistor and the second thin film transistor;
wherein potential received by the pixel electrode and potential received by the auxiliary electrode have a difference;
wherein a voltage of the auxiliary electrode is 70% of a voltage of the pixel electrode, and an electric field strength of a horizontal electric field formed between the pixel electrode and the auxiliary electrode is different from an electric field strength of a vertical electric field formed between the pixel electrode and the common electrode layer.

2. The display panel according to claim 1, wherein a size of the second thin film transistor is less than a size of the first thin film transistor.

3. The display panel according to claim 2, wherein a width-to-length ratio of a channel of the second thin film transistor is less than a width-to-length ratio of a channel of the first thin film transistor.

4. The display panel according to claim 3, wherein the potential received by the auxiliary electrode is less than the potential received by the pixel electrode.

5. The display panel according to claim 1, wherein a source of the first thin film transistor is electrically connected to the data line, a gate of the first thin film transistor is electrically connected to the scan line, a drain of the first thin film transistor is electrically connected to the pixel electrode and a source of the second thin film transistor;
a gate of the second thin film transistor is electrically connected to the scan line, and a drain of the second thin film transistor is electrically connected to the auxiliary electrode.

6. The display panel according to claim 1, wherein the auxiliary electrode is disposed around at least three sides of the pixel electrode, and a gap is formed between the auxiliary electrode and the pixel electrode.

7. The display panel according to claim 6, wherein a portion of the auxiliary electrode parallel to the data line overlaps or partially overlaps with an edge of the data line in a direction perpendicular to the array substrate, and the portion of the auxiliary electrode parallel to the scan line overlaps or partially overlaps with an edge of the scan line in a direction perpendicular to the array substrate.

8. The display panel according to claim 7, wherein a boundary of a side of the portion of the auxiliary electrode parallel to the data line near the pixel electrode is correspondingly located between the data line and the pixel electrode, and a boundary of a side of the portion of the auxiliary electrode parallel to the scan line near the pixel electrode is correspondingly located between the scan line and the pixel electrode.

9. The display panel according to claim 7, wherein two sides of the data line respectively overlap or partially overlap with the auxiliary electrodes corresponding to two adjacent pixel areas in a direction perpendicular to the array substrate, respectively, and the auxiliary electrodes corresponding to two adjacent pixel areas are insulated from each other.

10. The display panel according to claim 1, wherein the pixel electrode comprises a trunk electrode arranged in a cross shape and a branch electrode connected to the trunk electrode.

11. A display panel, comprising:
an array substrate;
a color filter substrate disposed opposite to the array substrate; and
a liquid crystal layer disposed between the array substrate and the color filter substrate;
the color filter substrate comprising a color filter layer and a common electrode layer disposed on the color filter layer;
the array substrate comprising:
a scan line extending in a horizontal direction;
a data line extending in a longitudinal direction;
a pixel electrode disposed corresponding to a pixel area surrounded by the scan line and the data line;
a first thin film transistor disposed corresponding to the pixel area, and configured to electrically connect the pixel electrode to the scan line and the data line;
an auxiliary electrode disposed on a same layer as the pixel electrode and arranged around the pixel electrode; and
a second thin film transistor disposed corresponding to the pixel area, wherein the auxiliary electrode is connected to the first thin film transistor and the second thin film transistor;
wherein potential received by the pixel electrode and potential received by the auxiliary electrode have a difference;
wherein a voltage of the auxiliary electrode is 70% of a voltage of the pixel electrode, and an electric field strength of a horizontal electric field formed between the pixel electrode and the auxiliary electrode is different from an electric field strength of a vertical electric field formed between the pixel electrode and the common electrode layer.

12. The display panel according to claim 11, wherein a size of the second thin film transistor is less than a size of the first thin film transistor.

13. The display panel according to claim 12, wherein a width-to-length ratio of a channel of the second thin film transistor is less than a width-to-length ratio of a channel of the first thin film transistor.

14. The display panel according to claim 13, wherein the potential received by the auxiliary electrode is less than the potential received by the pixel electrode.

15. The display panel according to claim 11, wherein a source of the first thin film transistor is electrically connected to the data line, a gate of the first thin film transistor is electrically connected to the scan line, a drain of the first thin film transistor is electrically connected to the pixel electrode and a source of the second thin film transistor;

a gate of the second thin film transistor is electrically connected to the scan line, and a drain of the second thin film transistor is electrically connected to the auxiliary electrode.

16. The display panel according to claim 11, wherein the auxiliary electrode is disposed around at least three sides of the pixel electrode, and a gap is formed between the auxiliary electrode and the pixel electrode.

17. The display panel according to claim 16, wherein a portion of the auxiliary electrode parallel to the data line overlaps or partially overlaps with an edge of the data line in a direction perpendicular to the array substrate, and the portion of the auxiliary electrode parallel to the scan line overlaps or partially overlaps with an edge of the scan line in a direction perpendicular to the array substrate.

18. The display panel according to claim 17, wherein a boundary of a side of the portion of the auxiliary electrode parallel to the data line near the pixel electrode is correspondingly located between the data line and the pixel electrode, and a boundary of a side of the portion of the auxiliary electrode parallel to the scan line near the pixel electrode is correspondingly located between the scan line and the pixel electrode.

19. The display panel according to claim 17, wherein two sides of the data line respectively overlap or partially overlap with the auxiliary electrodes corresponding to two adjacent pixel areas in a direction perpendicular to the array substrate, respectively, and the auxiliary electrodes corresponding to two adjacent pixel areas are insulated from each other.

20. The display panel according to claim 11, wherein the pixel electrode comprises a trunk electrode arranged in a cross shape and a branch electrode connected to the trunk electrode.

* * * * *